United States Patent [19]
Liu

[11] Patent Number: 5,448,710
[45] Date of Patent: Sep. 5, 1995

[54] DYNAMICALLY CONFIGURABLE INTERFACE CARDS WITH VARIABLE MEMORY SIZE

[75] Inventor: Christopher S. Liu, Lincoln, Calif.

[73] Assignee: Hewlett-Packard Company, Palo Alto, Calif.

[21] Appl. No.: 661,584

[22] Filed: Feb. 26, 1991

[51] Int. Cl.⁶ ............................................. G06F 12/02
[52] U.S. Cl. ............................. 395/497.03; 364/246; 364/971; 364/DIG. 1
[58] Field of Search ................. 364/200 MS, 900 MS; 395/400 MS, 425 MS

[56] References Cited

U.S. PATENT DOCUMENTS

| | | | |
|---|---|---|---|
| 4,254,473 | 3/1981 | Galdun | 395/275 |
| 4,468,729 | 8/1984 | Schwartz | 395/425 |
| 4,513,371 | 4/1985 | Celio | 395/400 |
| 4,542,454 | 9/1985 | Brcich et al. | 395/575 |
| 4,589,063 | 5/1986 | Shah et al. | 395/275 |
| 4,592,011 | 5/1986 | Mantellina et al. | 395/425 |
| 4,727,474 | 2/1988 | Batcher | 395/800 |
| 4,809,234 | 2/1989 | Kuwashiro | 395/425 |
| 4,908,789 | 3/1990 | Blokkum et al. | 395/425 |
| 4,926,314 | 5/1990 | Dhuey | 395/425 |
| 4,943,966 | 7/1990 | Giunta et al. | 395/400 |
| 4,945,472 | 7/1990 | Sakamura et al. | 395/775 |
| 4,951,248 | 8/1990 | Lynch | 395/425 |
| 4,979,144 | 12/1990 | Mizuta | 395/425 |
| 4,980,850 | 12/1990 | Morgan | 395/425 |
| 5,012,408 | 4/1991 | Conroy | 395/425 |
| 5,119,486 | 6/1992 | Albonesi | 395/425 |
| 5,161,221 | 11/1992 | Van Nostrand | 395/425 |
| 5,179,686 | 1/1993 | White | 395/425 |

OTHER PUBLICATIONS

IBM Technical Disclosure Bulletin, vol. 30, No. 3, Aug. 1987, "Programmable Address Comparator", pp. 1076–1078.

IBM Technical Disclosure Bulletin, vol. 33, No. 6B, Nov. 1990, "Programmable Main-Storage Card Map", pp. 455–458.

*Primary Examiner*—Reba I. Elmore

[57] ABSTRACT

Circuitry facilitates configuration of a memory within an interface card. The configuration includes configuring the memory size and the memory address space. A register stores configuration information from the computer system. Control lines are connected to the register and distribute information from the register to locations on the interface card. A comparator produces an output which indicates whether an address on address lines from the computer system is addressing memory locations within the memory. The comparator does this by comparing address bits on a first set of the address lines with control bits on a first set of the control lines. Logical circuitry, connected between a subset of the first set of the address lines and the comparator, is used to mask, from the comparator, address bits on the subset of the first set of address lines. Additional logical circuitry, connected to the second set of the control lines and connected between the subset of the first set of address lines and the memory is used for masking, from the memory, the address bits on the subset of the first set of address lines. When the address bits on the subset of the first set of address lines are masked from the comparator, the address bits on the subset of the first set of address lines are not masked from the memory. When the address bits on the subset of the first set of address lines are masked from the memory, the address bits on the subset of the first set of address lines are not masked from the comparator.

18 Claims, 3 Drawing Sheets

DYNAMICALLY CONFIGURABLE INTERFACE CARDS WITH VARIABLE MEMORY SIZE

BACKGROUND

The present invention concerns the dynamic configuration of interface cards which support different memory sizes.

Within computers, interface cards may be added to allow the personal computer to access various peripheral devices. The interface cards generally connect to an input/output (I/O) bus. Each I/O bus has an architecture which includes physical properties and a protocol by which devices on the bus communicate. One architecture used for I/O busses is the Extended Industry Standard Architecture (EISA).

An interface card which uses EISA requires a computer, upon boot-up, to allocate a certain amount of its address space to access memory within the interface card. For example, VECTRA personal computers manufactured and distributed by Hewlett Packard Company, having a business address of 3000 Hanover Street, Palo Alto, Calif., generally allocate an address space for a 16K×8 erasable programmable read-only memory (EPROM) on the interface card. Alternately, computers using HP Precision Architecture system, also available from Hewlett Packard Company, generally allocate an address space for a 32K×8 EPROM or a 64K×8 EPROM.

The differing EPROM size requirement between computer systems prevent interface cards from being interchangeable between computer systems. Often, in the prior art, this has required the separate manufacture of a completely different interface card for each computer system. However, this can be extremely expensive and inefficient.

In order to avoid having to manufacture a separate type of interface card for each system, other alternatives are attempted. For example, interface cards can be designed so that when different size EPROMs are used, traces may be cut and/or jumpers may be used. However, this requires manual intervention by a user which may include powering down the computer system.

An additional issue with allocating address space for EPROMs is the possibility of conflicts when two interface cards each have an EPROM which expect to be mapped into the same fixed location in memory. In the prior art this could be overcome by, for example, using switches or removable jumpers on the interface card for changing the address to which the EPROMs were mapped in the memory of the host computer system. This, however, also requires manual intervention by a user.

SUMMARY OF THE INVENTION

In accordance with the preferred embodiment of the present invention, circuitry is presented which facilitates configuration of a memory within an interface card. The configuration includes configuring the memory size and the memory address space. A register stores configuration information from the computer system. Control lines are connected to the register and distribute information from the register to locations on the interface card. A comparator produces an output which indicates whether an address on address lines from the computer system is addressing memory locations within the memory. The comparator does this by comparing address bits on a first set of the address lines with control bits on a first set of the control lines. Logical circuitry, connected between a subset of the first set of the address lines and the comparator, in response to at least one control bit placed on a second set of the control lines, is used to mask, from the comparator, address bits on the subset of the first set of address lines.

Additional logical circuitry, connected to the second set of the control lines and connected between the subset of the first set of address lines and the memory is used for, in response to the at least one control bit on the second set of the control lines, masking, from the memory, the address bits on the subset of the first set of address lines. When the address bits on the subset of the first set of address lines are masked from the comparator, the address bits on the subset of the first set of address lines are not masked from the memory. When the address bits on the subset of the first set of address lines are masked from the memory, the address bits on the subset of the first set of address lines are not masked from the comparator.

The masking circuitry allows a variety of sizes of EPROM memories to be placed in an interface card. For the minimum EPROM size supported by the interface card, none of the address lines to the comparator are masked and a maximum number of address lines to the EPROM are masked. In this way the smaller address space and fewer memory locations of the EPROM are taken into account. For the maximum EPROM size supported by the interface card, the maximum number of the address lines to the comparator are masked and none of the address lines to the EPROM are masked. In this way the larger address space and greater amount of memory locations of the EPROM are taken into account.

DESCRIPTION OF THE PREFERRED EMBODIMENT

Figure 1:
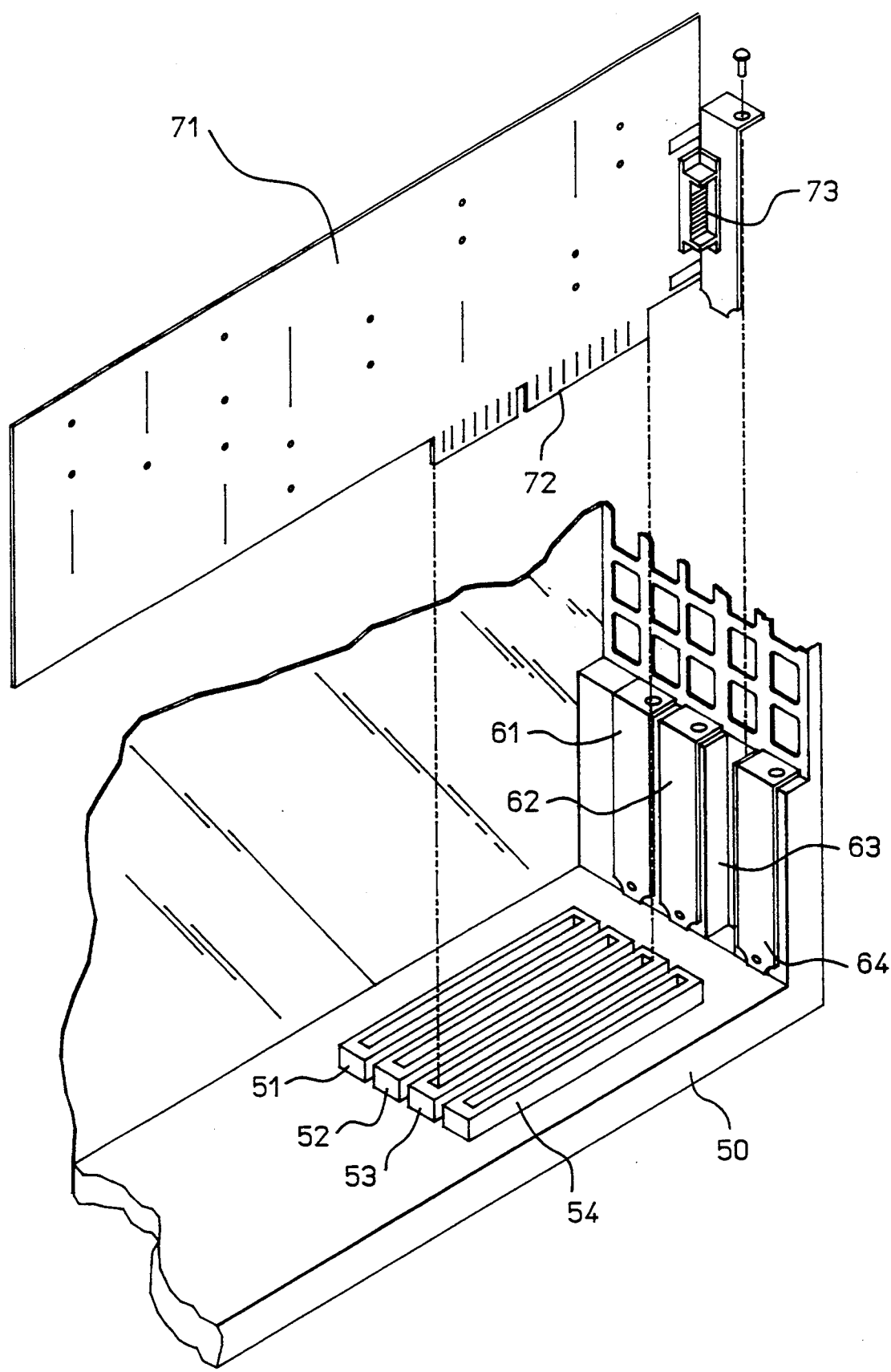
FIG. 1 and FIG. 2 show an interface card being placed in a slot within a computer system.

FIG. 1 shows slots within a computer case 50. A connector 51, a connector 52, a connector 53 and a connector 54 allow interface cards to be connected to an I/O bus which is compatible with EISA. A port 61, a port 62, a port 63 and a port 64 are generally covered except when an interface card is in place. For example, in FIG. 1, port 63 has been uncovered to allow for port connector 73 on interface card 71 to be placed in port 63.

Figure 2:
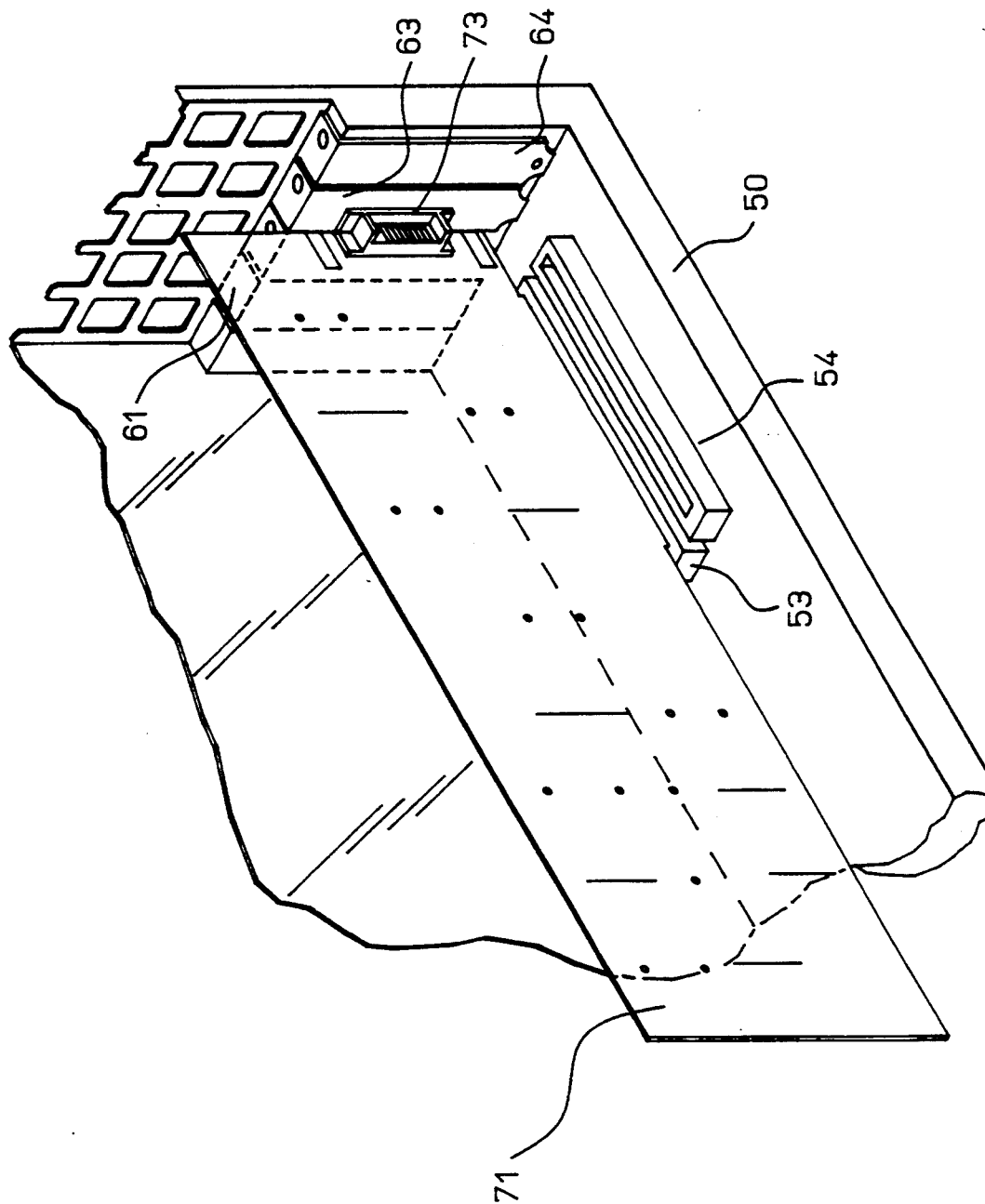

FIG. 2 shows interface card 71 placed within computer case 50. A connector 72 of interface card 71, shown in FIG. 1, has been placed within connector 53. Port connector 73 has been placed within port 63. Once in place, interface card 71 allows communication by the computer system with, for example, peripheral devices.

Figure 3:
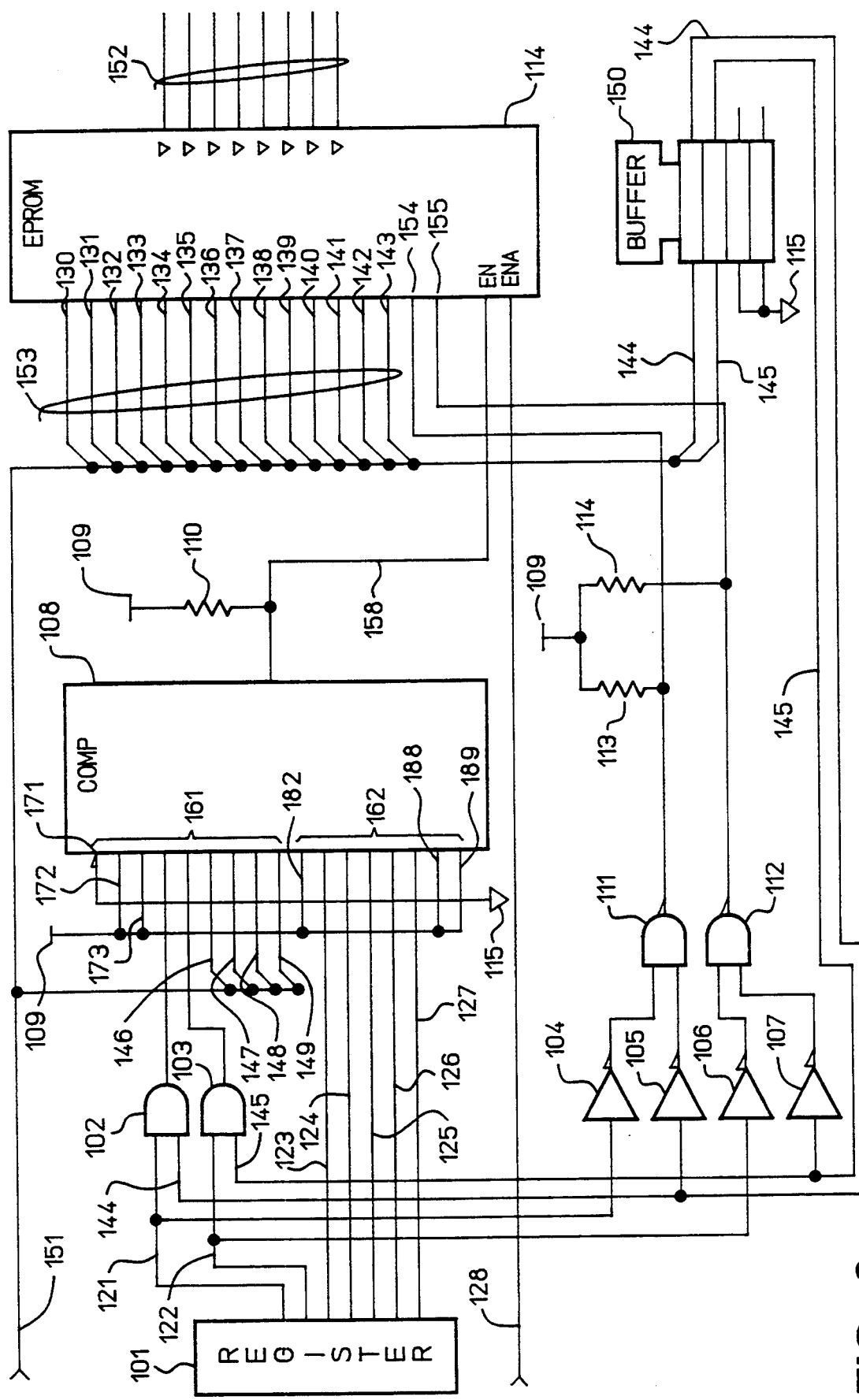
FIG. 3 shows a schematic of a circuit used to provide flexible configuration and memory mapping of an EPROM within an interface card in accordance with the preferred embodiment of the present invention.

FIG. 3 shows circuitry within an interface card, the circuitry being designed to support different size EPROMs. For example, the circuitry supports a 16K×8 EPROM used in interface cards for an HP VECTRA personal computer. The circuitry also supports a 32K×8 EPROM or a 64K×8 EPROM used in interface cards for HP Precision Architecture computer systems. Also, the circuitry shown in FIG. 3 allows for software configuration of address space within the computer system allocated for the interface card.

Within the circuit shown in FIG. 3, an EPROM 114 presents 8 bits of data on data lines 152. EPROM 114 may be, for example, a 16K×8 EPROM, part number 27C128 available from Intel Corporation, having a business address of 3065 Bowers Ave., Santa Clara, Calif. 95051. Alternately, EPROM 114 may be a 32K×8 EPROM, part number 27C256 available from Intel Corporation, or a 64K×8 EPROM, part number 27C512 also available from Intel Corporation.

EPROM 114 includes fourteen address inputs 153. Depending on the size of EPROM 114, an input 154 and an input 155 may also be used to address memory location within EPROM 114. The address inputs 153 allow addressing of 16K one byte memory locations within EPROM 114. The address inputs 153 are controlled by the low order bits of address lines 151. Address lines 151 include 20 address lines 130 through 149, with address line 130 containing the low order bit of an address and line 149 containing the high order bit of the address.

When EPROM 114 is a 16K×8 EPROM, only 14 address inputs are needed to address all 16K address locations within the 16K×8 EPROM. Therefore address lines 130 through 143 are used to address EPROM 114. Input 154 and Input 155, during the EPROM read cycle, are held at VCC by a VCC source 109. VCC is typically 5 volts.

When a 32K×8 EPROM is used, fifteen address lines are needed to address all 32K address locations within the 32K×8 EPROM. Therefore, in addition to address lines 130 through 143, input 154 receives the value on an address line 144 of address lines 151. Input 155 is at VCC during the EPROM read cycle.

When a 64K×8 EPROM is used, sixteen address lines are needed to address all 64K address locations within the 64K×8 EPROM. Therefore, in addition to address lines 130 through 143, input 154 receives the value on address line 144 and input 155 receives the value on an address line 145 of address lines 151.

A configuration register 101 generates control lines 121 through 127. The two low order bits of register 101 generate control line 121 and control line 122. Control line 121 and control line 122 are used to mask address line 144 and address line 145, respectively, when they are not being used.

When EPROM 114 is a 16K×8 EPROM, control line 121 is at logic 1 and control line 122 is at logic 1. When control line 121 is at logic 1, the output of a logic NOT gate 104 will always be at logic 0 and the output of a logic NAND gate 111 will always be at logic 1. This assures that input 154 will always be at logic 1. In order to deliver the full voltage of VCC to input 154, logic NAND gate 111 is an open collector logic NAND gate, and a resistor 113 having a resistance of, for example, 4.7 kilohms, connects the output of logic NAND gate 111 to VCC source 109. When control line 122 is at logic 1, the output of a logic NOT gate 106 will always be at logic 0 and the output of a logic NAND gate 112 will always be at logic 1. This assures that input 155 will always be at logic 1. In order to deliver the full voltage of VCC to input 155, logic NAND gate 112 is an open collector logic NAND gate, and a resistor 114 having a resistance of, for example, 4.7 Kilohms connects the output of logic NAND gate 112 to VCC source 109.

When EPROM 114 is a 32K×8 EPROM, a value is loaded in register 101 so that control line 121 is at logic 0 and control line 122 is at logic 1. When control line 121 is at logic 0, the output of logic NOT gate 104 will always be at logic 1. The output of logic NAND gate 111 will thus always be at the same value as an input to a logic NOT gate 105. Since the input of logic NOT gate 105 is address line 144, the output of logic NAND gate 111 will be equal to the value on address line 144. This assures that input 154 will be at the same logic value as is placed on address line 144. When control line 122 is at logic 1, the output of logic NOT gate 106 will always be at logic 0 and the output of logic NAND gate 112 will always be at logic 1. This assures that input 155 will always be at the full VCC voltage level.

When EPROM 114 is a 64K×8 EPROM, a value is loaded in register 101 so that control line 121 is at logic 0 and control line 122 is at logic 0. When control line 121 is at logic 0, the output of logic NOT gate 104 will always be at logic 1. The output of logic NAND gate 111 will thus always be at the same value as an input to logic NOT gate 105, that is, the output of NAND gate 111 will be equal to the value on address line 144. This assures that input 154 will be at the same logic value as is placed on address line 144. When control line 122 is at logic 0, the output of logic NOT gate 106 will always be at logic 1. The output of logic NAND gate 112 will thus always be at the same value as an input to a logic NOT gate 107. Since the input of logic gate NOT gate 107 is address line 145, the output of NAND gate 112 will be equal to the value on address line 145. This assures that input 155 will be at the same logic value as is placed on address line 145.

A buffer 150 is used to buffer address line 144 and address line 145 to accommodate the fan out of address line 144 and address line 145.

A comparator 108 is used to indicate to EPROM 114 when address space allocated to EPROM 114 is being addressed by an address on address lines 151. Comparator 108 compares inputs 161 with inputs 162. When each bit of inputs 161 is equal to each of their respective bits of inputs 162, then comparator 108 drives output line 158 to logic 0. This enables EPROM 114, indicating that the address on address lines 151 is addressing a location within EPROM 114. EPROM 114 then places on data output 152 the data addressed by the low order bits of address lines 151. When any bit of inputs 161 is not equal to the respective bit value from bits 162, comparator 108 places a logic 1 on output line 158. This indicates the address on address lines 151 does not address a location within EPROM 114. EPROM 114 is therefore disabled. When output line 158 is at logic 1, it is pulled up to VCC by a resistor 110 having a resistance of, for example, 4.7 kilohms, and connected to VCC source 109.

Inputs 162 of comparator 108 are used in the preferred embodiment as follows. An input 182 is unused, so it is connected to VCC source 109. Control line 123 is used as an enable/disable bit. When the interface card is in normal operation mode, control line 123 is at logic 1. When it is desired to disable the interface card, for example during configuration time, a logic 0 is placed in register 101 at a position corresponding to control line 123. Four bits of configuration address are placed in register 101. These four bits of configuration address are placed on control lines 124, 125, 126 and 127. When EPROM 114 is a 32K×8 EPROM, the value placed on control line 124 is always logic 0. When EPROM 114 is a 64K×8 EPROM, register 101 places a logic 0 both on control line 124 and on control line 125. In the preferred embodiment shown in FIG. 3, address lines 151 include 20 address bits allowing the addressing of 1 Meg of memory. As shown in FIG. 3 high order inputs 188 and 189 of inputs 162, corresponding to high order address lines 148 and 149 of address lines 151, are connected to VCC source 109. This restricts the configuration of addresses of memory locations in EPROM 114 to the upper quadrant of a MEG of addressable memory.

Inputs 161 of comparator 108 are used in the preferred embodiment as follows. An input 172 is unused, so it is connected to VCC source 109. An input 173 is to be compared with enable/disable control line 123, so input 173 is connected to VCC 109. A logical AND gate 102 and a logical AND gate 103 generate the next two bits. Logical AND gate 102 performs a logical AND function on address line 144 of address lines 151 and a control line 121 from register 101. Logical AND gate 103 performs a logical AND function on address line 145 of address lines 151 and a control line 122 from register 101.

When EPROM 114 is a 16K×8 EPROM, the value placed on control line 121 is a logic 1 and the value placed on control line 122 is a logic 1. This allows address line 144 and address line 145 to be used by comparator 108 to perform address comparisons. When EPROM 114 is a 32K×8 EPROM, the value placed on control line 121 is a logic 0 and the value placed on control line 122 is a logic 1. This allows address line 145 to be used by comparator 108 in the address comparisons. Address line 144 is not used in the comparison. When EPROM 114 is a 64K×8 EPROM, the value placed on control line 121 is a logic 0 and the value placed on control line 122 is a logic 0. In this case neither address line 144 nor address line 145 is used by comparator 108 in the address comparison. The remainder of inputs 161 are connected to address lines 146, 147, 148 and 149 of address lines 151, as shown.

During configuration, the computing system writes into register 101 a value which includes the appropriate values for control lines 121 through 127. A line 128 is connected to an enable input of EPROM 114 and is used as a memory read enable. The signal placed on line 128 is generated by the I/O bus.

I claim:

1. In an interface card for a computer system, circuitry which facilitates configuration of a memory within the interface card within the computer system wherein the configuration includes configuring memory size and memory address space, the circuitry comprising:

register means for storing configuration information from the computer system;

control lines, coupled to the register means, for distributing information from the register means to locations on the interface card;

comparator means, coupled to the memory, for producing an output which indicates whether an address on address lines from the computer system is addressing memory locations within the memory, the comparator means comparing address bits on a first set of the address lines with control bits on a first set of the control lines; and, first masking means, coupled between a subset of the first set of the address lines and the comparator means, for, in response to at least one control bit on a second set of the control lines, masking, from the comparator means, address bits on the subset of the first set of address lines.

2. Circuitry as in claim 1 wherein the masking means is first masking means and the circuitry additionally comprises:

second masking means, coupled to the second set of the control lines and coupled between the subset of the first set of address lines and the memory, for, in response to the at least one control bit on the second set of the control lines, masking, from the memory, the address bits on the subset of the first set of address lines.

3. Circuitry as in claim 2 wherein when the first masking means masks the address bits on the subset of the first set of address lines from the comparator means, the second masking means does not mask the address bits on the subset of the first set of address lines from the memory, and when the second masking means masks the address bits on the subset of the first set of address lines from the memory, the first masking means does not mask the address bits on the subset of the first set of address lines from the comparator means.

4. Circuitry as in claim 3, wherein, for each of the at least one control bits, the first masking means includes a logical AND gate with an input coupled to an address line from the subset of the first set of address lines, an input coupled to a control line from the second set of control lines and an output coupled to an input of the comparator means.

5. Circuitry as in claim 4, wherein, for each of the at least one control bits, the second masking means includes a logical NAND gate with an input coupled through a first logical NOT gate to an address line from the subset of the first set of address lines, an input coupled through a second logical NOT gate to a control line from the second set of control lines and an output coupled to an input of the memory.

6. Circuitry as in claim 1 wherein address bits masked by the second masking means masks are raised to VCC.

7. Circuitry as in claim 1 wherein the memory is an erasable programmable read-only memory.

8. Circuitry as in claim 1 wherein the control lines include a control line, coupled to the comparator means, on which may be placed a control bit which causes the comparator means to produce output which indicates that the address on address lines from the computer system does not address memory locations within the memory.

9. Circuitry as in claim 1 wherein an enable line is coupled to an enable input of the memory.

10. A method for configuration of a memory within an interface card within the computer system wherein the configuration includes configuring memory size and memory address space, the method comprising the steps of:

(a) storing configuration information from the computer system;

(b) distributing the configuration to locations on the interface card by control lines;

(c) comparing, by a comparator, address bits on a first set of address lines from the computer system with control bits on a first set of the control lines to produce an output which indicates whether an address on the address lines is addressing memory locations within the memory; and, (d) masking, from the comparator, address bits on a subset of the first set of address lines, the masking being performed in response to at least one control bit on a second set of the control lines.

11. A method as in claim 10 additionally comprising the step of:
  (e) masking, from the memory, the address bits on the subset of the first set of address lines in response to the at least one control bit on the second set of control lines.

12. Circuitry as in claim 11 wherein when in step (d) the address bits on the subset of the first set of address lines are masked from the comparator, then in step (e) the address bits on the subset of the first set of address lines are not masked from the memory, and when in step (e) the address bits on the subset of the first set of address lines are masked from the memory, then in step (d) the address bits on the subset of the first set of address lines are not masked from the comparator.

13. A method as in claim 12, wherein in step (d), for each of the at least one control bits, the masking is performed by a logical AND gate.

14. A method as in claim 13, wherein in step (e), for each of the at least one control bits, the masking is performed by a logical NAND gate with an input coupled through a first logical NOT gate to an address line from the subset of the first set of address lines, an input coupled through a second logical NOT gate to a control line from the second set of control lines and an output coupled to an input of the memory.

15. A method as in claim 11 wherein in step (e) address bits are masked by being raised to VCC.

16. A method as in claim 10 wherein the memory is an erasable programmable read-only memory.

17. A method as in claim 10 wherein the control lines include a control line, coupled to the comparator, on which may be placed a control bit which causes the comparator to produce output which indicates that the address on address lines from the computer system does not address memory locations within the memory.

18. A method as in claim 10 wherein an enable line is coupled to an enable input of the memory.

* * * * *